Oct. 30, 1962     W. J. L. HOFMANN     3,060,981

DEPTH-OF-CUT GAGE APPARATUS FOR MILLING MACHINES

Filed Aug. 6, 1958     4 Sheets-Sheet 1

INVENTOR.
WILLI JAKOB LUDWIG HOFMANN
BY Dicke and Craig
ATTORNEYS

Oct. 30, 1962     W. J. L. HOFMANN     3,060,981
DEPTH-OF-CUT GAGE APPARATUS FOR MILLING MACHINES
Filed Aug. 6, 1958     4 Sheets-Sheet 2

INVENTOR.
WILLI JAKOB LUDWIG HOFMANN
BY Dick and Craig
ATTORNEYS

Oct. 30, 1962   W. J. L. HOFMANN   3,060,981
DEPTH-OF-CUT GAGE APPARATUS FOR MILLING MACHINES
Filed Aug. 6, 1958   4 Sheets-Sheet 3

INVENTOR.
WILLI JAKOB LUDWIG HOFMANN
BY Dicke and Craig
ATTORNEYS

Oct. 30, 1962 W. J. L. HOFMANN 3,060,981
DEPTH-OF-CUT GAGE APPARATUS FOR MILLING MACHINES
Filed Aug. 6, 1958 4 Sheets-Sheet 4

INVENTOR.
WILLI JAKOB LUDWIG HOFMANN
BY Dicke and Craig
ATTORNEYS

United States Patent Office 3,060,981
Patented Oct. 30, 1962

3,060,981
DEPTH-OF-CUT GAGE APPARATUS FOR
MILLING MACHINES
Willi Jakob Ludwig Hofmann, Muhlacker-Lomersheim,
Germany, assignor to Eugen Lutz K.G., Muhlacker-
Lomersheim, Germany
Filed Aug. 6, 1958, Ser. No. 753,445
Claims priority, application Germany Aug. 9, 1957
18 Claims. (Cl. 144—134)

The present invention relates to a milling machine for shaping edges, facings, recesses, and other profiles on workpieces, particularly of wood, plastic, and similar soft materials, in accordance with rectilinear, curved, angular, or any other nonlinear guide surfaces on such workpieces.

For guiding a milling cutter along curved, angular, or any other irregular edges, it has already been proposed prior to this invention to provide on the cutter shaft and adjacent to the cutter suitable guide rings, rollers, and the like which are intended to maintain the cutter at the required distance from the guide surface. This known method of guiding the milling cutter has the disadvantage that the guide rings or the like which can be used only for one particular depth or height of the cut to be machined have to be exchanged if the cutting depth or cutting height is to be changed.

It is the principal object of the present invention to overcome this disadvantage of the prior milling machines and their guiding devices, and to provide a depth-of-cut gauge apparatus for such machines which permits the milling of edge surfaces, recessed edges, facings, and the like of any desired shape, depth, or height without requiring any difficult adjustments or exchanges of the guiding device when the edge portions or the like to be shaped are to be made of a different depth or height or are to be provided at different distances from the guiding device.

More specifically, it is an object of the present invention to provide a depth-of-cut gauge apparatus guiding device for a milling machine which automatically adapts itself to any guide surfaces of a rectilinear, curved, angular, or other irregular shape, and thus permits any predetermined cutting depth or width of the shaping or milling cutter to be maintained regardless of the shape and the irregularities of the guide surface.

A further object of the present invention is to provide a guiding device which is easily readjusted if the cutter has been reground or if during the shaping operation it is found that the cutter does not attain the desired cutting depth or height.

Another object of the invention resides in the provision of a guiding device of the type as described, the guiding action of which does not exert any pressure upon the rotating shaft of the milling machine or the bearing thereof, and the guiding pressure of which is not liable to mar the finish of the respective guide surfaces along which the guiding device according to the invention is moved.

The present invention consists in principle in the provision of a guiding device which is mounted so as to be pivotable about the axis of the milling or shaping tool, and the actual guide member of which is mounted separate from and in an adjustable spaced relation to the axis of the tool. Thus, for example, the guiding device may be pivotably mounted on a flange on the motor housing by means of a bearing ring which is disposed coaxially to the shaft of the motor or milling cutter.

In stationary milling machines, particularly table-type milling machines, a preferred embodiment of the invention resides in securing the guide member on a rotatable element so as to be adjustable thereon, and in mounting this element so as to be pivotable coaxially to the milling cutter on the lower end of a vertical main column which, in turn, is mounted on a bracket which is removably secured to the work table of the milling machine. In this embodiment of the invention, the guide member therefore pivots together with the rotatable element about the same axis as that of the cutter, and the guide member itself may be disposed either above or below or at the same level as the cutter. If two cutters are disposed in a spaced relation above each other, the pivotable guide member may also be disposed at a level between the two cutters.

Because of its moveability and its particular design and suspension, the pivotable guide member is capable while sliding along a given guide edge, which may be either straight, curved, or angular, to pivot automatically and continuously in accordance with the curvatures, corners, or other irregularities of the guiding edge, and at the same time and automatically to adjust the tool and the workpiece accordingly so that the present cutting depth will always be maintained. This operation and result which was previously not attainable with milling machines of a similar type affords a series of very important advantages such as the following:

As compared with the usual guide rollers, rings, and the like which only permit a certain cutting depth or cutting height for each milling operation and have to be exchanged if a groove, recess, or the like of a different depth or height is to be cut, the pivotable guiding device according to the invention permits any grooves, recesses or the like to be cut without requiring any exchange of the guide member and merely by requiring a very simple adjustment thereof to whatever cutting depth or height might be needed. Also, with the previous guiding devices in the form of rings, rollers, and the like, it often occurred that during the milling process it appeared that the particular cutter used did not produce the desired depth or height of the cut and that it was then necessary to exchange the guide ring for another. The present invention, however, permits the cutter as well as the pivotable guiding device to be adjusted during the cutting operation in accordance with the desired cutting depth or height. Obviously, such easy adjustability reduces the time required for setting up the machine for one particular job and for changing the set-up for another job, and it also means that the work to be carried out may be done far more accurately than was previously possible.

Further objects, features, and advantages of the present invention will appear from the following detailed description thereof, particularly when read with reference to the accompanying drawings, in which—

FIGURE 6 shows a side view, partly in cross section, of a stationary table-type milling machine with a guiding device according to the invention; while

Figure 1:
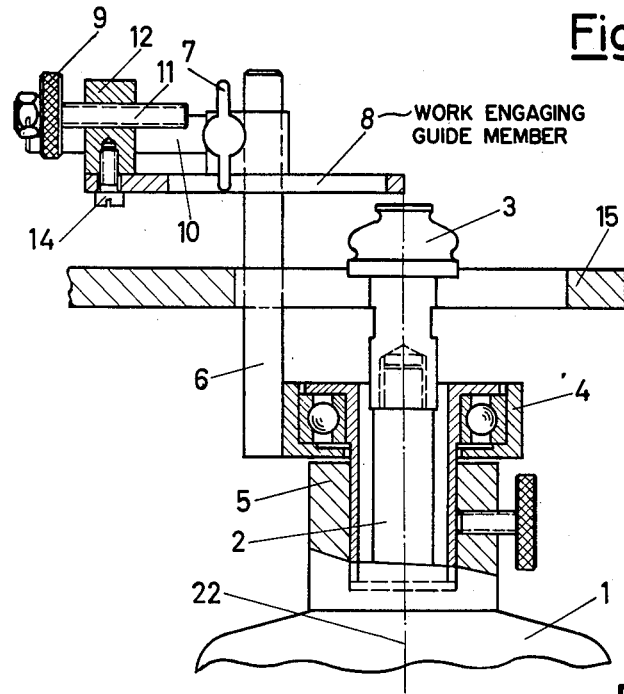
FIGURE 1 shows a side view, partly in cross section, of a part of a hand milling machine with the guiding device or depth-of-cut gauge apparatus according to the invention.
Figure 2:
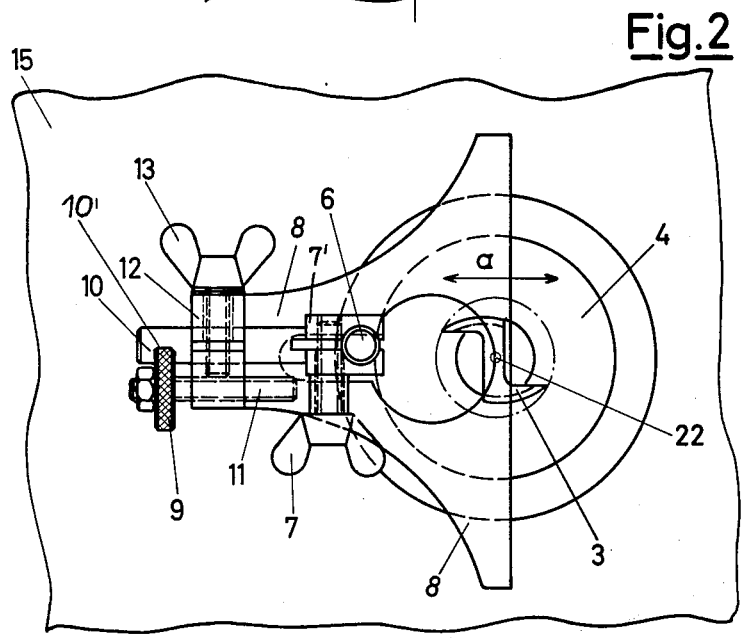
FIGURE 2 shows a top view of FIGURE 1.

Referring to the drawings, and first particularly to FIGURES 1 and 2, the numeral 1 indicates the housing of the motor of a hand milling machine which has a shaft 2 with a milling cutter 3 mounted at the outer end thereof. The motor housing 1 further carries a flange or similar socketlike extension 5 on which, coaxially with shaft 2, a ball-bearing member 4 is mounted which rotatably supports a rod 6 on which a work engaging flat, platelike guide member 8 may be securely clamped in different positions along the length thereof by means of a wing bolt 7 on a clamping fixture 7'. Supporting rod 6 extends parallel to the motor shaft 2 and is thus capable of revolving freely around the axis of shaft 2, which likewise applies to the other embodiments of the invention, as shown in FIGURES 3 to 5.

Figure 3:
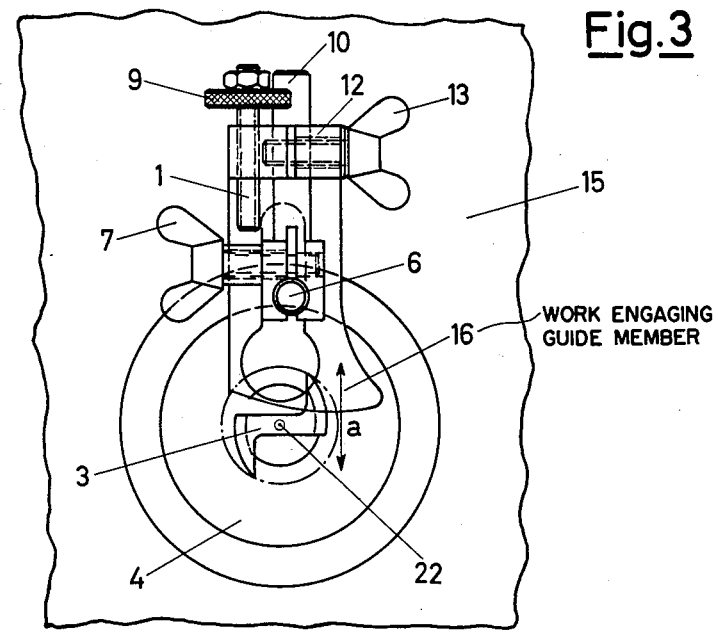
FIGURE 3 shows a view similar to FIGURE 2, but with a slightly modified guide member.
Figure 4A:
FIGURE 4a shows a cross section of an edge portion which has been shaped with a setup according to FIGURE 4.
Figure 4:
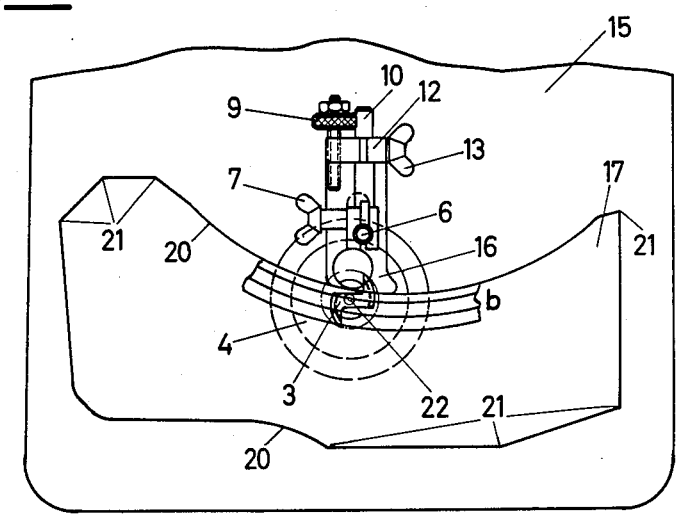
FIGURE 4 shows the guide member according to FIGURE 3 in operation.
Figure 5:
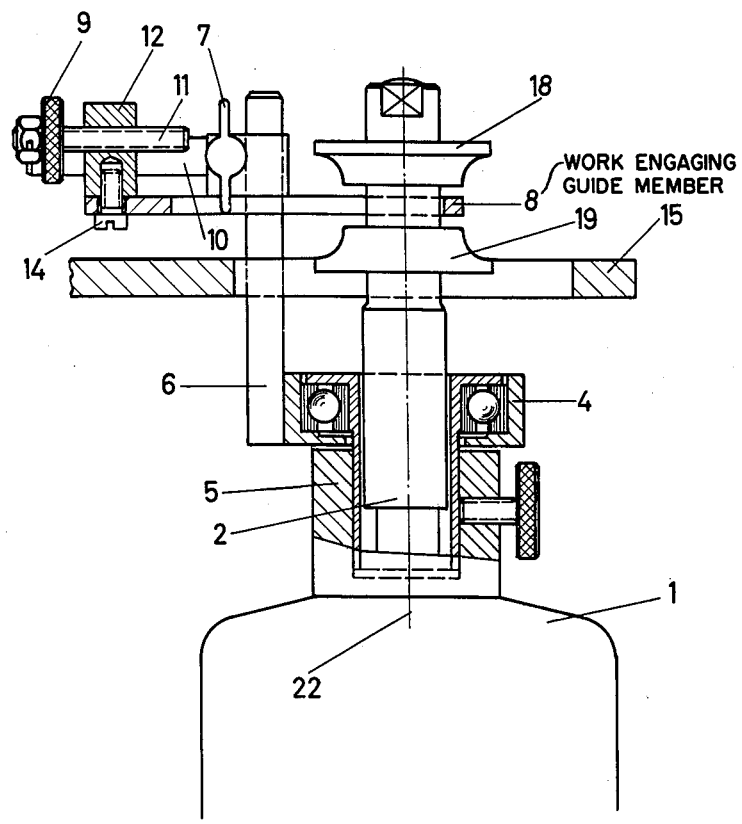
FIGURE 5 shows a milling machine similar to FIGURE 1, but with the guide member associated with two cutters.

As illustrated in FIGURE 2, the pivotable guide plate 8 preferably has a substantially triangular shape with two sides of the triangle being curved, although it may also be of a different shape, as illustrated, for example, in FIGURES 3 and 4. Guide plate 8 which may consist, for example, of plastic, is adjustably mounted on supporting rod 6, for which purpose the clamping fixture 7' carries a bolt 10 which has a recess into which the head of a setscrew 9 engages which is screwed into a clamping lug 12 mounted on the end of guide plate 8 and, in turn, clamped on bolt 10 by a wing bolt 13. If wing bolt 13 is loosened and setscrew 9 is turned, guide plate 8 may be shifted in the direction as indicated by the two-pointed arrow $a$ in FIGURE 2 relative to the axis of shaft 2 and cutter 3. By tightening bolt 13, guide plate 8 will be locked in the respective adjusted position. Numeral 15 indicates a part of the worktable on which the workpiece or the milling machine is placed. If the milling machine is placed on the worktable 15, that is, in the reverse position to that shown in FIGURE 1, it is rested thereon by means of its base, not shown, and moved along the top thereof.

The entire guide unit is removably mounted on bearing member 4 so as to be easily exchangeable, and guide plate 8 may also be exchanged by the removal of a screw 14 which secures it to clamping lug 12.

FIGURES 3 and 4 illustrate the same apparatus as above described, except for the fact that the guide plate 16 is of a different shape from that shown in FIGURE 2 for sliding along an edge portion 20, 21 of a workpiece 17 to produce a recessed edge $b$ of a shape as illustrated in FIGURE 4a. For this purpose, workpiece 17 is placed on the table 15 in the position as shown in FIGURE 4, whereupon the recess $b$ may be milled out in a single operation by the cutter 3. Even though this recessed edge $b$ might extend along the entire irregular outer edge 20, 21 of workpiece 17, it will be of the same depth and cross-sectional shape throughout.

The function and operation of the pivotable guide unit may be briefly described as follows:

A workpiece 17 is to be provided with a recessed edge $b$ of a cross-sectional shape as shown in FIGURE 4a. The outer contours of workpiece 17 are partly curved as indicated at 20, and partly straight with intermediate corners 21. For milling a uniform recess $b$ in one continuous operation along the entire outer edge of the workpiece 17, the latter is pressed against guide plate 16, as shown in FIGURE 4, and moved in the direction opposite to the direction of rotation of cutter 3 in constant sliding engagement with guide plate 16. As may be seen particularly in FIGURES 1, 4, and 5, guide plate 8 or 16, respectively, is mounted so as to be easily pivotable about the axis 22 of cutter 3. When the operator guides the workpiece 17 along cutter 3, the latter will cut into the material as far as guide plate 8 or 16 will permit.

The pivoting movement of guide plate 8 or 16 about the axis of rotation of the cutter then insures that it will always remain in the proper position relative to the guiding edge 20, 21 of the workpiece and that the desired cutting depth will always be maintained. When the cutter 3 arrives at the area, for example, of the corners 21 of the workpiece, guide plate 8 or 16 will suddenly pivot about an angle corresponding to the angle which is formed either by the straight lines intersecting at this corner point or by the tangents of the two curves which intersect at this point. Consequently, immediately after passing beyond the irregularity, that is, the corner 21, the cutter will automatically assume the new changed position relative to the workpiece without requiring of the operator to watch that he should suddenly swivel the workpiece 17 about a certain angle.

Guide member 16 has a work engaging, slightly curved surface contour having a radius of curvature substantially larger than the minimum distance from said contour to shaft 2.

The most important advantage of the invention, however, resides in the unlimited ability of adjusting the cutting depth of the tool and in the full use of its diameter. Prior to this invention it was always necessary to exchange at least the guides or even the cutter itself.

If it is found during the milling operation that the cutter does not penetrate deeply enough into the material, it is merely necessary to adjust the setscrew 9 to the desired cutting depth. The vertical adjustment of guide plate 8 or 16 may also be carried out while a machine continues to run. The operator may also adjust the guide plate in a similar manner by means of setscrew 9 if he finds, after the cutter has been reground, that its diameter has thereby become too small. If this occurred prior to this invention, it was necessary to exchange the guide roller or the like and to replace it by a new one of a different diameter or to regrind the guide roller or the like as well. Obviously, this entailed work interruptions which rendered the respective job rather expensive, and it also had the disadvantage that it required a large stock of guide rollers or the like of different dimensions to be kept and careful measurements to be made to determine the proper size of guide roller to be used for the particular job.

An important feature of the invention is also the fact previously mentioned that it is now possible to make full use of the entire diameter of the cutter by inserting it entirely into the material. Previously, only a part of the diameter of the cutter could be used since the guide ring also had to have a certain minimum diameter which obviously reduced the useful diameter of the cutter.

FIGURE 5 illustrates a pivotable guide unit similar to that shown in FIGURE 1 except for the fact that the guide plate 8 is mounted so as to be disposed between two cutters 18 and 19.

Figure 6:
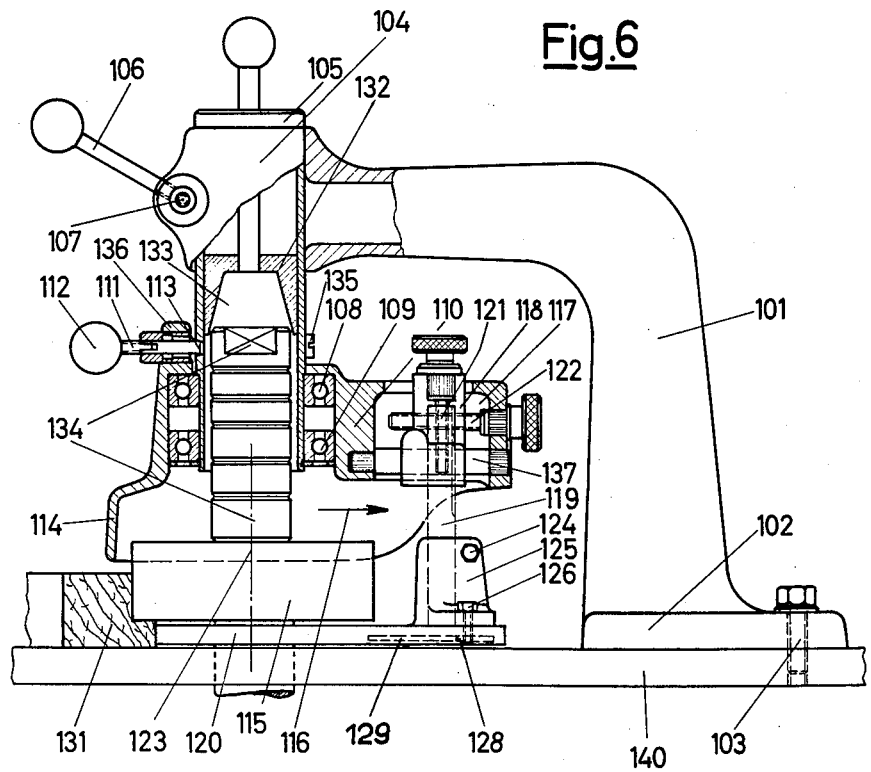
Figure 7:
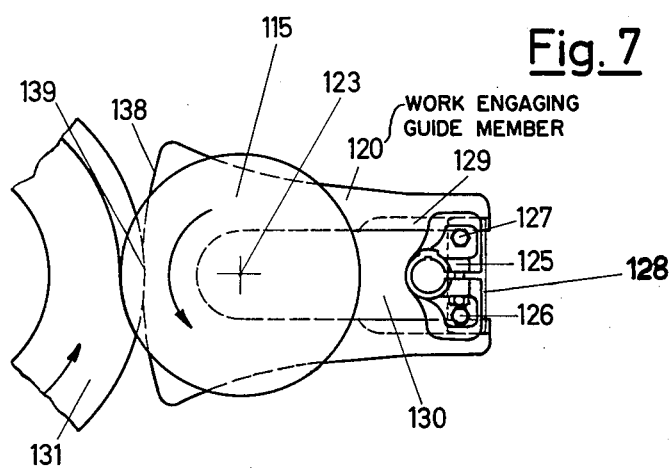
FIGURE 7 shows a plan view of the guide member alone, as shown in FIGURE 6, together with a diagrammatic view of the cutter.

FIGURES 6 and 7 illustrate a modification of the pivotable guide unit according to the invention as being applied to a stationary milling machine, the motor of which is mounted underneath a worktable so that the milling shaft projects upwardly through the table. This machine essentially consists of an angular supporting arm 101 with a base plate 102 at its lower end which is secured by bolts 103 to a worktable 140. The other end of arm 101 carries a clamping device 104 for adjustably securing the vertical main column 105 in a fixed position. The main column 105 is therefore adjustable in its axial direction relative to arm 101, preferably by means of a pair of clamping jaws, and may thus be secured at different levels above the table 140. The clamping device 104 may be operated by a lever 106 which turns a threaded bolt 107. The lower end of the vertical column 105 carries a horizontal arm 110 of the guide unit which is rotatably mounted on column 105 by means of ball bearings 108 and 109. For certain types of work, arm 110 may be arrested in a certain fixed position by means of a locking device consisting of a pin 111 with a knob 112 thereon which is adapted to engage into a bore 113 in column 105.

In order to prevent any accident during the operation of the milling machine, the rotary arm 110 is preferably designed to form a protective cover by being provided at the front of the machine, that is, at the left side in FIGURE 6, with a wall portion 114 which extends downwardly and partly over and around the cutter 115 so as to enclose the upper end of the cutter at the front and at least a part of the sides. This protective cover 114 is, however, open toward the rear so that the chips and shavings will all be passed toward the rear in the direction indicated by the arrow 116. This cover 114 may extend to a point closely above the upper surface of the workpiece 131 so that the operator, while pressing the workpiece against the cutter cannot possibly come into contact with the cutter.

For adjusting the guide plate 120 in the vertical direction relative to the worktable 140 and also for adjusting its position relative to the axis of rotation 123 of the cutter 115, is vertical supporting rod 119 may be secured to the pivotable arm 110 by means of a special adjustment device 118 which permits a very accurate adjustment of the distance of guide plate 120 from the worktable 140, as well as of its position relative to the axis 123 of the cutter 115. For this purpose, the pivotable arm 110 is provided with a recess 117 in which a block-shaped member 118 is mounted. This member 118 has a vertical bore in which the upper end of the supporting rod 119 is slidably mounted. A setscrew 121 with a knurled head is rotatably mounted in the upper end of member 118 and screwed into a threaded bore in rod 119 so that, when setscrew 121 is turned in one or the other direction, supporting rod 119 with guide plates 120 thereon will be raised or lowered. A similar setscrew 122, also with a knurled head, is rotatably mounted in the end wall of the pivotable arm 110 and is screwed into a threaded bore in the block-shaped member 118 for adjusting the same together with supporting rod 119 in a horizontal direction. Thus, if setscrew 122 is turned in one or the other direction, the distance between supporting rod 119 and the vertical axis 123 of cutter 115 will be increased or reduced. A horizontal round pin 137 is secured in the walls of arm 110 surrounding the recess 117 and extends through a smooth bore in the block-shaped member 118 so that the latter is slidable in the horizontal direction on pin 137 and guided thereby when being adjusted by setscrew 122.

The lower end of supporting rod 119 is removably secured within a bracketlike clamp 125 by means of a bolt 124 which at the other side may carry a wing nut, not shown. This bracket 125 is, in turn, clamped to the two arms of the flat bifurcated guide plate 120 by means of a pair of bolts 126 and 127 which are screwed into a clamping plate 128, the ends of which engage in a pair of raillike recesses at the lower side of guide plate 120. This guide plate 120 is preferably given a finlike shape, and its central elongated aperture 130 intermediate the two arms thereof extends to and around the shaft of the milling machine which thus passes through its aperture. This elongated aperture 130 permits a coarse adjustment of guide plate 120 in a horizontal direction relative to the axis 123 of the cutter, while the fine adjustment may be carried out by setscrew 122. While in the embodiment according to FIGURE 6, guide plate 120 is mounted underneath the cutter 115, it may also be mounted between two cutters in a manner similarly as shown in FIGURE 5. For limiting the extent of the pivoting movement of arm 110 and thus also of guide plate 120, the main column 105 is provided with stops 135, preferably in the form of screws, which cooperate with suitable stops on arm 110, for example, in the form of a projection 136 on arm 110.

As illustrated in FIGURE 7, guide plate 120, which may consist, for example, of plastic, has a finlike shape. The front edge 138 of guide plate 120 which is adapted to engage with the workpiece is substantially arcuate, except at its central part which is normally in direct contact with the workpiece where it has a short straight portion 139. This straight portion 139 is provided for bridging or compensating small irregularities in straight or curved portions of the workpiece 131 so that the recess to be milled will have a smooth surface.

The operation of the guide unit as illustrated in FIGURES 6 and 7 is substantially similar to that already described with respect to FIGURES 1 to 5. The workpiece 131 into which a recess is to be cut is guided along the guide plate 120 so that the cutter 115 will then mill out the desired recess. If the workpiece 131 has a curved, angular, or other uneven shape, guide plate 120 will always engage with the lower part of the workpiece and follow any curvatures, bulges, and the like thereof, and always insure that the cutter 115 will penetrate to the same desired depth into the material. This is due to he fact that, by its pivotable suspension, guide plate 120 can always adapt itself to the shape and extent of the guiding edge of the workpiece.

For carrying out the first coarse adjustment of the guide unit to the size and shape of workpiece 131, guide plate 120 may be adjusted in the vertical direction along supporting rod 119 by loosening bolt 124, and in the horizontal direction by loosening bolts 126 and 127 and sliding it along the rails 129. This coarse adjustment may then be followed by a fine adjustment by means of the two setscrews 121 and 122 in the manner as previously described. Finally, the entire fine-adjustment device may be locked in a fixed position by a clamping bolt, not shown, which is mounted on arm 110 and engages with the block-shaped member 118.

The angular supporting arm 101 is installed on the worktable 140 and adjusted in the proper position thereon in the following manner:

First, a cylindrical centering member 132 is inserted into the hollow main column 105 until the conical inner walls 133 of member 132 engage with the upwardly projecting shaft of the cutter or with the spacing rings 134 thereon. The entire apparatus including centering member 132 will thus be properly positioned relative to the vertical axis of the cutter. Thereupon, supporting arm 101 will be secured in a fixed position on worktable 140 by the bolts 103. Finally, the centering member 132 will be withdrawn from column 105.

Although my invention has been illustrated and described with reference to the preferred embodiments thereof, as applicable particularly to milling machines for wood, plastics, and the like, I wish to have it understood that it is in no way limited to the details of such embodiments, but is capable of numerous modifications within the scope of the appended claims.

Having thus fully disclosed my invention, what I claim is:

1. A depth-of-cut gauge apparatus for milling machines for shaping edges, recesses, and the like on workpieces of wood, plastic, and the like comprising a guide member, a bearing connected to said guide member and having means thereon for mounting said bearing on the motor housing of a milling machine and coaxially to the milling tool of said machine so as to permit said guide member to pivot about the axis of said milling tool and separately from said tool, a rod-shaped member secured to said bearing and extending in spaced parallel relationship to the axis of said milling tool, and means for adjustably securing said guide member to said rod-shaped member.

2. A depth-of-cut gauge apparatus for milling machines including a milling tool for shaping edges, recesses, and the like on workpieces of wood, plastic, and the like comprising bearing means mounted on a milling machine in coaxial relationship with the axis of a milling tool of said milling machine, a guide member having a curved, substantially triangular shape designed to bear a predetermined relationship to the contour of a workpiece being machined, and means operatively connecting said guide member to said bearing means to enable said guide member to rotate freely about the axis of said milling tool during operation of said tool and independently thereof.

3. A depth-of-cut gauge apparatus for milling machines including a milling tool for shaping edges, recesses, and the like on workpieces comprising bearing means mounted coaxially with respect to the axis of said milling tool, a guide member having a guide contour adapted to abut against a workpiece, said contour having a radius of curvature substantially greater than the distance between said axis of said milling tool and said contour during machining of said workpiece and means operatively connecting said guide member to said bearing means to enable said guide member to pivot freely about the axis of said milling tool during operation of said tool and independently thereof.

4. A depth-of-cut gauge apparatus for a milling machine having a tool rotatable about a shaft and adapted to shape edges, recesses, and the like on workpieces, guide means for said tool having a substantially rectilinear workpiece engaging contour, said contour being effective to mitigate unevenness on the surface of the work being milled and means mounting said guide means for movement about the shaft of said tool during operation thereof so as to maintain a predetermined cutting depth.

5. A depth-of-cut gauge apparatus for a milling machine having a tool rotatable about a shaft and adapted to machine a workpiece, a guide member to guide said tool along a workpiece and having an essentially rectilinear workpiece engaging contour in a plane essentially perpendicular to the axis of the shaft of said tool, said contour being substantially larger in length than the minimum distance from said shaft to said contour and means to enable pivotable movement of said guide member about the shaft of said tool during operation thereof so as to maintain a predetermined cutting depth.

6. A depth-of-cut gauge apparatus as defined in claim 1, wherein said adjustable securing means comprise means for adjusting the position of said guide member along the length of said rod-shaped member for varying the distance of said guide member from said milling tool, and means for adjusting the position of said guide member in a direction transverse to the axis of said milling tool.

7. A depth-of-cut gauge apparatus as defined in claim 1, wherein said adjusting means comprise a clamp adapted to be clamped to said rod-shaped member in different positions along the length thereof for varying the distance of said guide member from said milling tool, a boltlike member rigidly secured to said clamp and extending transverse to said rod-shaped member, said boltlike member having a recess therein, a second clamp secured to one end of said guide member and adapted to be clamped to said boltlike member in different positions along the length thereof, and a setscrew screwed through said second clamp and having a knurled head peripherally engaging into said recess in said boltlike member for adjusting the position of said guide member in a direction transverse to the axis of said milling tool when said setscrew is turned after said second clamp has been loosened on said boltlike member.

8. A depth-of-cut gauge apparatus as defined in claim 7, further comprising means for removably securing said guide member to said second clamp to permit said guide member to be exchanged for another.

9. In combination with a stationary milling machine having a worktable, a vertical drive shaft projecting upwardly through said table, and at least one milling tool mounted on said drive shaft above said table, a guiding device for shaping edges, recesses, and the like on workpieces of wood, plastic, and the like comprising an angular supporting bracket adapted to be secured at one end to the upper surface of said table, a vertical column mounted on the other end of said bracket and extending coaxially to said drive shaft, an arm rotatably mounted on said column for pivotal movement about said column, a guide member extending in a direction transverse to the axis of said drive shaft, and means for adjustably securing said guide member to said rotatable arm within a vertical plane spaced from the axis of said drive shaft.

10. The combination as defined in claim 9, further comprising a protective cover secured to said rotatable arm and extending downwardly therefrom and partly around said milling tool, said cover being open toward the rear as seen from the position of the workpiece to permit the cuttings to be guided from said milling tool toward the rear.

11. The combination as defined in claim 9, in which said adjustable securing means comprise a vertical rod secured to said guide member, and means on said rotatable arm for accurately adjusting said vertical rod with said guide member thereon in a vertical direction and also in a horizontal direction.

12. The combination as defined in claim 11, in which said rotatable arm has a recess in its lower side, said adjusting means being at least partly mounted within said recess and controlled from the outside of said arm.

13. The combination as defined in claim 9, further comprising means on said rotatable arm for arresting said arm in a fixed position relative to said vertical column to prevent its pivotal movement about said column.

14. The combination as defined in claim 9, further comprising associated means on said rotatable arm and on said vertical column for limiting the extent of the pivoting movement of said arm.

15. The combination as defined in claim 9, further comprising clamping means secured to the other end of said supporting bracket for adjustably securing said vertical column at different levels above said worktable.

16. A guiding device for milling machines including a milling tool for shaping edges, recesses and the like on work pieces of wood, plastic and the like comprising bearing means mounted on said milling machine in coaxial relationship with the axis of said milling tool, a guide member having an essentially rectilinear work-engaging contour in a plane substantially perpendicular to said axis, and means operatively connecting said guide member to said bearing means to enable said guide member to rotate about the axis of said milling tool independently thereof, said guide member being provided with an aperture so as to permit the drive shaft of said milling tool to extend through said aperture.

17. A depth-of-cut gauge apparatus for milling machines including a milling tool for shaping edges, recesses and the like on work pieces of wood, plastic and the like comprising bearing means mounted on said milling machine in coaxial relationship with the axis of said milling tool, a guide member, and means operatively connecting said guide member to said bearing means to enable said guide member to rotate about the axis of said milling tool independently thereof, said milling machine having at least two milling tools mounted on the same drive shaft, said guide member being provided with an aperture therein to permit said drive shaft to extend through said aperture, and said guide member being disposed intermediate said milling tools.

18. A depth-of-cut gauge apparatus for milling machines including a milling tool for shaping edges, recesses and the like on work pieces of wood, plastic and the like comprising bearing means mounted on said milling machine in coaxial relationship with the axis of said milling tool, a guide member, and means operatively connecting said guide member to said bearing means to enable said guide member to rotate about the axis of said milling tool independently thereof, said guide member being a substantially flat, fin-shaped bifurcated plate provided with an elongated aperture through which said shaft extends substantially separating two arms of said plate.

References Cited in the file of this patent

UNITED STATES PATENTS 206,360     Shimer et al. _____ July 23, 1878

(Other references on following page)

UNITED STATES PATENTS

| | | |
|---|---|---|
| 726,516 | Deaton | Apr. 28, 1903 |
| 877,894 | Kelley | Jan. 28, 1908 |
| 938,135 | Fellows | Oct. 26, 1909 |
| 1,705,602 | Balzi et al. | Mar. 19, 1929 |
| 2,255,541 | Dremel | Sept. 9, 1941 |
| 2,722,957 | Marvosh | Nov. 8, 1955 |

FOREIGN PATENTS

| | | |
|---|---|---|
| 470,509 | Germany | Jan. 18, 1929 |
| 306,682 | Italy | Mar. 29, 1933 |
| 494,489 | Italy | May 25, 1954 |
| 94,268 | Switzerland | Apr. 17, 1922 |